United States Patent [19]

Knight et al.

[11] Patent Number: 4,720,047

[45] Date of Patent: Jan. 19, 1988

[54] AUGER FOR CONVEYING MATERIALS SUCH AS MANURE

[75] Inventors: William S. Knight; William M. Saunders, both of Brodhead, Wis.

[73] Assignee: Knight Manufacturing Corporation, Brodhead, Wis.

[21] Appl. No.: 940,780

[22] Filed: Dec. 12, 1986

[51] Int. Cl.$^4$ .................................... A01C 15/00
[52] U.S. Cl. ................................ 239/675; 198/676; 366/319; 366/323
[58] Field of Search .................. 239/675, 665, 672; 198/676, 671; 366/319, 322, 323, 336, 603

[56] References Cited

U.S. PATENT DOCUMENTS

| | | | |
|---|---|---|---|
| 1,023,888 | 4/1912 | Sorensen | 198/676 |
| 3,090,605 | 5/1963 | Copeland et al. | |
| 3,155,288 | 11/1964 | Landgraf | |
| 3,303,917 | 2/1967 | Wilkes et al. | |
| 3,420,452 | 1/1969 | Vaughan | 239/670 |
| 3,478,970 | 11/1969 | Siwersson et al. | |
| 4,206,841 | 6/1980 | Lundgren | |
| 4,362,272 | 12/1982 | Martin | |
| 4,467,967 | 8/1984 | Martin | |
| 4,473,184 | 9/1984 | Martin | |
| 4,479,608 | 10/1984 | Martin | 239/675 |
| 4,528,098 | 7/1985 | Treyssac et al. | |

FOREIGN PATENT DOCUMENTS

| | | | |
|---|---|---|---|
| 44948 | 1/1939 | Netherlands | 366/322 |
| 86859 | 11/1957 | Netherlands | 366/322 |

Primary Examiner—Andres Kashnikow
Assistant Examiner—Karen B. Merritt
Attorney, Agent, or Firm—Isaksen, Lathrop, Esch, Hart & Clark

[57] ABSTRACT

An improved auger is used for conveying flowable materials, such as liquid and semi-solid manure, through a bed of a container such as a manure spreader and out through a discharge opening. The auger has a shaft with a back end and a front end, a continuous blade, and paddles for discharging the manure. The continuous blade extends radially outwardly from the shaft and includes helical portions and at least one plate portion which is substantially perpendicular to an axis of the auger. The plate portions extend between the helical portions of the blade to make the blade substantially continuous. The rotation of the auger causes helical portions of the blade to accelerate the manure in a direction of the front end wall and causes the plate portions to slow the movement of manure so that the rate of flow of manure is controlled and boiling action of manure against the front end wall of the container is inhibited. Additionally, the rotation causes the plate portions to create turbulence within the manure as it contacts the plates to disrupt bridging of manure over the auger.

25 Claims, 4 Drawing Figures

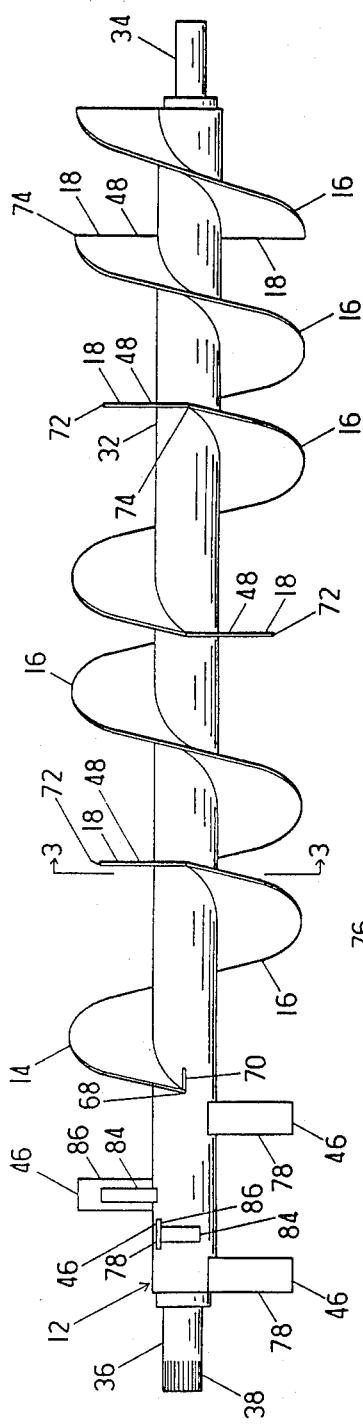

AUGER FOR CONVEYING MATERIALS SUCH AS MANURE

BACKGROUND OF THE INVENTION

1. Field of the Invention

The invention relates generally to augers which are used for conveying materials within an enclosure and particularly to augers used in moving liquid or semi-solid manure through the bed of a manure spreader.

2. Description of the Prior Art

Manure spreaders utilize various types of mechanisms, including augers, to move manure within the body of the spreader to a discharge opening. In manure spreaders which use augers to convey manure along the bed of the spreader, it is common to find that certain consistencies of manure boil up within the spreader container bed, particularly at the end of the auger, and may form bridges over the auger. Various designs have been addressed to these problems. One type of manure spreader, as shown in U.S. Pat. No. 4,467,967 to Martin, has a longitudinally positioned auger with a series of separate blades which are arranged in oppositely generated helices to urge the manure from the rear and from the front of the manure container body toward a discharge gate which is positioned in the body between the ends thereof. By moving manure from the ends to the middle portion of the body, the auger may eliminate some boil-up that would occur at an end wall, but it may not always be advantageous to have the discharge opening in the middle portion of the body. The auger shown in that patent is also raised and lowered hydraulically to break up bridging of manure within this particular spreader.

Additionally, a variety of augers and screws are currently used to move fertilizers, sludge, solid and liquid manure, and other types of materials through chutes, tubes, beds, and other containers. U.S. Pat. No. 4,206,841 to Lundgren discloses a screw conveyor which has a helical blade which extends outwardly from the shaft for conveying material along a passage from one end to the other with rotation of the screw. A plurality of helical blade segments are mounted at one end of the screw, each segment extending over an arc of about 100° to about 130° around the shaft of the screw. These blade segments split the main flow of material from the helix up into several smaller flows, thereby maintaining a relatively uniform flow of the conveyed material even when the conveyor is filled only to 30% of its flow capacity. The smaller blades at the end of the screw are discontinuous, that is, they are not connected to one another.

A screw-driven sludge thickener having a rotary screw extending longitudinally in an enclosure is disclosed in U.S. Pat. No. 4,528,098 to Treyssac et al. The pitch of the Treyssac screw varies in successive stages so that the distance between the flights of the screw varies in the different stages. U.S. Pat. No. 3,303,917 to Wilkes et al. discloses a material conveying and distributing device having an auger with a helical blade which varies in pitch depending upon its relative position on the shaft of the auger.

A particular problem which occurs in manure spreaders with auger feed is that with certain consistencies of manures, particularly semi-solid manure, the auger may not supply material at a continuous rate to the discharge opening, thus creating uneven and sporadic spreading of manure. Such inconsistent supply of manure may occur because the auger is rotating too slowly and does not convey manure to the discharge opening at a rate commensurate with the rate at which manure is drawn from the opening by a spreading device mounted at the opening. Conversely, inconsistent spreading can occur if the auger is rotating too fast and supplies more material to the discharge opening than can be spread by the spreading device. The excess material being fed by the auger which cannot be discharged is constrained by the sides and end panels of the manure spreading container and tends to be pushed upwardly. This action tends to compress and pack the material above the auger, resulting in a bridging condition in which the packed manure forms a solid mass which bridges over the auger. The bridged material thus cannot be fed by the auger to the discharge opening, resulting in sporadic discharge or no discharge at all.

Because the consistency of manure, particularly the semi-solid type, can vary greatly from load to load and even within a load, it is not practical to attempt to vary the auger speed to match the flow of material from the auger with the rate at which material can be spread from the discharge opening. While multi-blade augers, such as those described above, have been used in an attempt to avoid bridging and provide more continuous flow of manure, it is generally preferable that the auger have a continuous blade since continuous blades are less susceptible to damage by rocks, wood, steel or other foreign materials. Continuous blades also tend to be self-cleaning; for example, long fibrous materials, such as hay, do not hang up on the continuous flights and clog the path of flow as can happen with augers having many separate blades. Because of the self-cleaning action of a continuous flight auger, freezing of material on the auger during cold weather is also not a problem as it can be with augers having multiple blades.

SUMMARY OF THE INVENTION

The present invention solves the aforementioned and other problems of the prior art, and provides an improved auger which can convey flowable materials such as liquid or semi-solid manure through a container at a consistent rate. A preferred manure spreader which utilizes the improved auger may have a V-shaped bed formed from a pair of end walls, a pair of side walls, and a rounded bottom, one of the side walls having a discharge opening located near the front end wall of the bed. The improved auger is mounted for rotation adjacent the rounded bottom of the bed to deliver manure to the discharge opening at a rate which substantially matches the rate of discharge from the opening.

The auger of the invention has a continuous blade which operates to avoid bridging of semi-solid manure over the auger and of boiling up of the manure. The continuous blade extends radially outwardly from the shaft and includes a plurality of helical portions with normal helical pitch and of a radius approximately the same as the rounded bottom of the manure spreader bed, and a plurality of plate portions which are mounted substantially perpendicular to the axis of the auger. These plate portions extend between the helical portions of the blade to make the blade substantially continuous. Rotation of the auger causes the helical portions of the blade to contact the manure and accelerate it toward an end wall of the spreader. The plate portions of the blade cause the movement of the manure to be controlled to prevent boil up at the end wall and serve to inhibit bridging and to maintain a consistent flow rate irrespective of the characteristics of the manure in the spreader.

The ability of the improved auger of the present invention to regulate the flow of material may be understood by considering the movement of material conveyed by the auger. Material in contact with the helical portions of the auger—the auger portions having a relatively high pitch—are moved forward as the auger rotates toward the plates, which have a low or zero pitch. As this movement occurs, the material must either compress, accelerate through the low pitch portions of the auger, or be driven away from the auger. Although there may be some compression of the material, the reduction in pitch between the helical portions and the plate portions is too great to be accommodated solely by compression of the material. The more liquid materials tend to accelerate through the low pitch region, thus causing turbulence and agitation of the accelerated material and any material surrounding the auger. In the more solid types of materials, the predominant action is the pushing up of the material into the space above the auger, since the auger is adjacent the bottom of the container and material can only flow away from the auger substantially upwardly. The upward pushing action causes material above the auger to heave and undulate, and thereby be sufficiently agitated that it remains in a substantially flowable state, helping to avoid solidification of the material sufficient to form a bridge over the auger.

Since only a portion of the material being fed by the auger can pass through the low pitch plate areas, a void is created downstream of the plate areas where the helical portions again make contact with the manure to drive it away from the plates. The material above the auger in the area behind the plates then drops or is drawn into the void so formed. As a consequence, bridging is further inhibited and the auger is charged with material along its entire length rather than just at the end of the auger from which feeding begins.

The plate portions of the blade each have a margin which defines the radial height of the plate portion. The radial height of each plate portion where it joins a back end of a helical portion is preferably equal to the radial height of that helical portion, and may be less elsewhere along the plate portion's margin. Such a reduction in radius of the plate portions in comparison to the helical portions allows some of the manure to pass across the margin of the plate portion of the blade as the manure moves toward the front end of the bed. The margin of each blade plate portion preferably has a straight edge that chops manure as the auger rotates. The auger also preferably has a plurality of paddles which extend tangentially outwardly from the shaft near the discharge opening. These paddles each have a pushing surface which pushes manure away from the auger and out of the bed into the discharge opening.

Further objects, features and advantages of the invention will be apparent from the following detailed description when taken in conjunction with the accompanying drawings.

BRIEF DESCRIPTION OF THE DRAWINGS

In the drawings:

FIG. 2 is a plan view of the improved auger.

FIG. 3 is a cross-sectional view taken along line 3—3 of FIG. 2.

FIG. 4 is a side elevational view of the improved auger of FIG. 2.

DESCRIPTION OF THE PREFERRED EMBODIMENT

Figure 1:
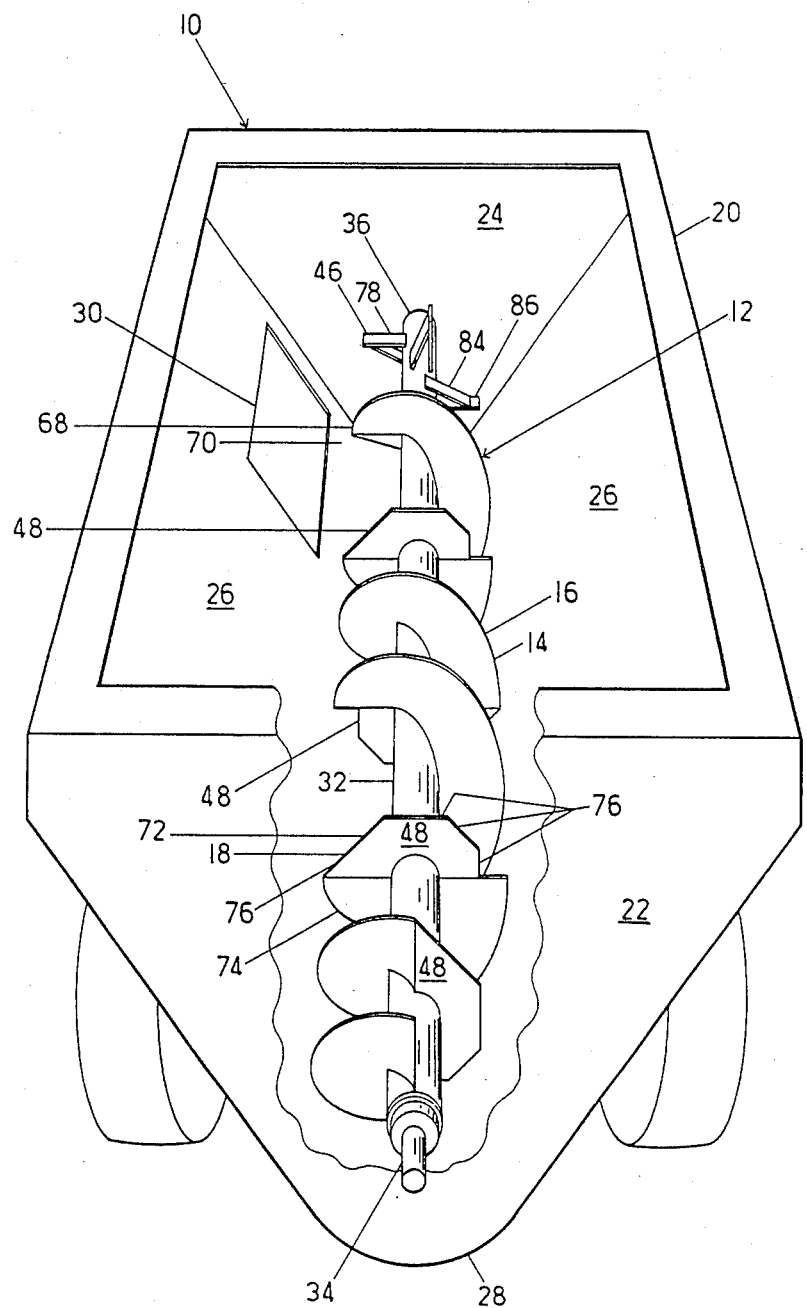
FIG. 1 is a perspective view of a manure spreader with improved auger constructed in accordance with the invention, with a portion of the back end wall cut away to show the entire length of the improved auger.

As shown in drawings, the manure spreader 10 of the present invention has an improved auger 12 with a continuous blade 14 having helical portions 16 and plate portions 18. The manure spreader 10 has a V-shaped bed 20 having a back end wall 22, a front end wall 24, a pair of side walls 26 and a rounded bottom 28. The side walls 26 with the bottom 28 form the bed 20 into a general V-shape as shown in FIG. 1. One of the side walls 26 has a discharge opening 30 therein near the front end wall 24. As best shown in FIGS. 2 and 4, the improved auger 12 includes a shaft 32 having a back end 34 and a front end 36, with the front end of the shaft rotatably mounted to the front end wall 24 and the back end of the shaft rotatably mounted to the back end wall 22 so that the shaft can rotate about a longitudinally aligned axis of rotation. The back end 34 of the shaft 32 has splines 38 which allow the auger to be engaged by a standard drive system well known in the art.

The continuous blade 14 extends radially outwardly from the shaft 32, and includes a plurality of helical portions 16 with radius approximately the same as that of the rounded bottom 28 of the bed 20. The blade 14 further includes a plurality of plate portions 18 which are perpendicular or substantially perpendicular to the axis of the auger 12. These plate portions 18 extend between the helical portions 16 of the blade 14 so that the blade 14 is substantially continuous. Rotation of the auger 12 causes the helical portions 16 of the blade 14 to contact the manure (not shown) and to accelerate it in the direction of the front end wall 24. Unchecked, this acceleration toward the front end wall 24 would cause the boiling action of semi-solid manure which does not pass through the discharge opening as the excessive manure flows against the wall 24. However, the plate portions 18 control the movement of manure in the direction of the front end wall 24 as described above, thereby preventing the boiling up of manure against the front end wall 24. Additionally, the plate portions 18 each create an upward turbulence within the manure as the manure moves against a back face 48 of each plate portion 18. This turbulence and the voids created behind the plate portions inhibits bridging of semi-solid manure over the auger 12.

The preferred improved auger 12 has the continuous blade 14 mounted to the shaft 32 in any suitable way, as by welding. The blade 14 has a series of helical portions 16 and connected plate portions 18 going from near the back end 34 toward the front end 36 of the shaft 32. These blade portions are preferably connected to the shaft and to the adjacent helical portions by welding. There are preferably several plate portions 18 separating a series of helical portions 16. Satisfactory conveying of various consistencies of manures has been obtained with the plate portions preferably extending in an arc of about 180° around the shaft and the helical portions preferably extending about the shaft in an arc from about 180° to 360°, although other ranges of arc lengths for the helical and plate portions may be utilized as desired. In the exemplary auger shown in the drawings, the first helical portion 16 begins near the back end 34 of the shaft 32 and winds 180° around the shaft 32 where it joins the first plate portion 18. The first plate portion 18 circles perpendicularly to the axis 180° around the shaft 32 to where it joins with the second helical portion 16. The second helical portion 16 winds 270° around the shaft 32 to where it joins with the second plate portion. Again, the second plate portion 18 circles perpendicularly to the axis about 180° around the shaft 32 to the third helical portion 16. The third helical portion 16 winds 360° around the shaft 32 to the third plate portion 18. The third plate 18 circles perpendicularly to the axis 180° around the shaft 32 to the fourth helical portion 16. The fourth helical portion winds 360° around the shaft to the fourth plate portion 18. The fourth plate portion circles perpendicularly to the axis 180° around the shaft 32 to the fifth and final helical portion 16 which ends the continuous blade 14. While these stated angular measurements disclose the preferred improved auger 12, other various combinations of alternating helical portions 16 and plate portions 18 may be used and be considered an alternate embodiment of the present invention. Additionally, the plate portions 18 may circle less than or greater than 180° around the shaft 32. The fifth helical portion 16 at the end 68 of the blade 16 is joined to an end fin 70. The end fin 70 is a small plate of metal, which may be tapered as shown, which extends perpendicularly out from the shaft and is joined to the front end 68 of the blade 16 to reinforce the end of the blade.

As is best shown in FIG. 3, the plate portions 18 of the blade 14 each have a margin 72 which defines the radial height of the plate portion. Where a plate portion 18 joins a back end 74 of a helical portion 16, the radial height of the plate portion 18 is preferably equal to the radial height of the helical portion 16. However, elsewhere along its margin 72, the radial height of the plate portion 18 is preferably somewhat less than that of the helical portion 16. Since the radial height of much of the plate portion 18 in such a case is less than that of the helical portions 16, some manure will pass across the margin 72 of the plate portion 18 of the blade 14 as the manure moves in the direction of the front end wall 24. The plate portions 18 of the preferred auger 12 have, along the margin 72 of each plate portion 18, four straight edges 76 which chop the manure as the auger 12 rotates. Although the preferred auger 12 has plate portions 18 with four straight edges 76, alternate embodiments of the improved auger 12 may have plate portions 18 with any number of straight edges for chopping manure which passes over or under the plate portion as the auger 18 rotates. It is also preferred that the plate portions 18 be flat and mounted with the plane of each plate perpendicular to the axis of rotation of the auger. However, the plates may also be formed as slight helices, having a few degrees of pitch, which interconnect the normal pitch helical portions. Plates with a slight pitch rather than zero pitch will also serve to reduce the speed at which manure is propelled by the auger as well as to provide the agitating action which aids in preventing bridging.

As shown in FIGS. 2 and 4, a plurality of paddles 46 extend tangentially outwardly from the shaft 32 near the location of the discharge opening 30. Each paddle 46 has a pushing surface 78 which pushes manure out the discharge opening 30 as the auger 12 rotates. The preferred auger 12 has five paddles 46 which proceed in a series in a frontward direction along the shaft 32. The paddles 46 are placed along the shaft 32 so that each paddle 46 is spaced axially equidistant from the adjacent paddles 46 and also 90° circumferentially from the adjacent paddles 46. Since each paddle 46 is spaced circumferentially 90° from its adjacent paddle 46, the fifth paddle 46, which is the front-most paddle, is therefore circumferentially aligned with the first or back-most paddle 46. Alternate embodiments of the present invention may vary the number of paddles 46 and the spacing between adjacent paddles 46. In the preferred auger 12, each paddle 46 further includes a stiff brace 84 which extends between the shaft 32 and a face 86 of the paddle 46 opposite the pushing surface 78. Alternatively, the auger may have paddles 46 which are pivotally joined to the shaft 32. In such an embodiment, each paddle additionally includes a spring (not shown) which extends between the shaft 32 and the face 86 of the paddle opposite the pushing surface 78. This spring maintains the paddle pushing surface 78 generally in tangential relation to the shaft 32, and compresses to allow the paddle 46 to pivotally give way to any substantial impediments in the path of the paddle 46 which might damage the paddle 46. After passing over the impediment, the paddle 46 is pushed by the spring back into its normal tangential position in relation to the shaft 32.

In operation, the manure spreader 10 with improved auger 12 serves as an effective means for spreading all consistencies of manure on a field. After the bed 20 of the manure spreader 10 has been filled with manure, the manure spreader 10 may be operated by rotating the auger 12 by its end 36 by means of a standard drive system. As the auger 12 turns, the helical portions 16 of the blade 14 come into contact with adjacent portions of manure and accelerate them through the passageway formed between separate flights of the blade 14. When a portion of manure is in the passageway adjacent to the helical portions 16, the manure accelerates in the general direction of the front end wall 24. Then when that portion of the manure moves through the passageway, so that it is forced against a back face 48 of a plate portion 18, the manure slows down. This slow-down creates an upward turbulence in the manure which breaks down and prevents the formation of any bridging over the auger 12. The void formed behind the plates draws manure from above down into the auger. Additionally, the progressive acceleration and slowing down of the manure as it moves along the passageway causes the manure to move in the general direction of the front end wall 24 at a controlled, consistent pace.

After exiting the fifth helical portion 16, the manure comes into contact with the paddles 46 which are located on the shaft 32 nearby the discharge opening 30. As the auger 12 turns, the pushing surface 78 of each paddle 46 ejects the manure it contacts out of the discharge opening 30. In this manner, the improved auger 12 empties the bed 20 of substantially all manure, whether liquid or semi-solid. The present invention is advantageous in that it does not require a separate auger or hydraulic lifting of the auger preventing the buildup of bridging over the auger.

It is understood that the invention is not limited to the particular embodiment disclosed herein as illustrative, but embraces much modified forms thereof as come within the scope of the following claims.

What is claimed is:

1. An improved auger adapted for use in moving liquid of semi-solid materials through a container comprising:

(a) a shaft having a back end and a front end and an axis of rotation; and (b) a continuous blade mounted to and extending radially outwardly from the shaft, the blade including plural helical portions and at least one plate portion substantially perpendicular to the axis of rotation of the shaft and extending between the helical portions of the blade to make the blade substantially continuous on the shaft, and whereby rotation of the auger causes the helical portions of the blade to accelerate material in contact therewith in a direction toward the front end of the shaft and causes the plate portions to slow the movement of the material so that boiling action of material at the front end of the shaft is inhibited, and furthermore causes the plate portions to each create turbulence within the material as the material moves against the plate portions to inhibit bridging of material over the auger.

2. The improved auger of claim 1 wherein the continuous blade has plural plate portions, each plate portion extending between helical portions.

3. The improved auger of claim 2 wherein each helical portions extends around the shaft in an arc between about 180° and 360° and each plate portion extends about the shaft in an arc of approximately 180°.

4. The improved auger of claim 1 wherein the plate portions of the blade each have a margin which defines the radial height of the plate portion, and wherein the radial height of a plate portion where it joins back end of a helical portion is equal to the radial height of the helical portion and is less elsewhere along its margin, so that some material may pass across the margin of the plate portion as the material moves in the direction of the front end of the shaft.

5. The improved auger of claim 4 wherein the margin of each plate portion has at least one straight edge that chops material which passes across the margin of the blade plate portion as the auger rotates.

6. The improved auger of claim 5 wherein the margin of the blade plate portion has four straight edges.

7. The improved auger of claim 1 wherein the auger includes a plurality of paddles extending tangentially outwardly from the shaft, the paddles having a pushing surface which pushes material away from the auger when the auger rotates.

8. The improved auger of claim 7 wherein there are five paddles proceeding in a series in a frontward direction along the shaft, wherein each paddle is spaced axially equidistant the adjacent paddles and ninety degrees circumferentially from the adjacent paddles so that the back-most paddle and front-most paddle are circumferentially aligned.

9. A manure spreader for spreading liquid or semi-solid manure onto a field, comprising:

(a) a bed having a back end wall, a front end wall, a pair of side walls and a rounded bottom, the side walls forming a general V-shape with the rounded bottom, one of the side walls having a discharge opening therein near the front end wall; and (b) an auger which includes (i) a shaft having a back end, which is rotatably mounted to the back end wall of the bed, and a front end which is rotatably mounted to the front end wall of the bed so that the shaft can rotate about an axis of rotation adjacent to the bottom of the bed; and (ii) a continuous blade mounted to and extending radially outwardly from the shaft, the blade including plural helical portions and at least one plate portion substantially perpendicular to the axis of rotation of the shaft and extending between the helical portions of the blade to make the blade substantially continuous on the shaft, whereby rotation of the auger causes the helical portions of the blade to accelerate the manure in the direction of the front end wall and causes the plate portions to slow the movement so that boiling action of manure against the front end wall is inhibited, and furthermore causes the plate portions to each create turbulence within the manure as it moves against the plate portions which inhibits bridging of manure over the auger.

10. The manure spreader of claim 9 wherein the continuous blade has plural plate portions, each plate portion extending between helical portions.

11. The manure spreader of claim 10 wherein each helical portion extends around the shaft in an arc between about 180° and 360° and each plate portion extends about the shaft in an arc of approximately 180°.

12. The manure spreader of claim 9 wherein the plate portions of the blade each have a margin which defines the radial height of the plate portion, and wherein the radial height of a plate portion where it joins a back end of a helical portion is equal to the radial height of the helical portion and is less elsewhere along its margin, so that some manure may pass across the margin of the plate portion as the manure moves in the direction of the front end wall.

13. The improved manure spreader of claim 12 wherein the margin of each plate portion has at least one straight edge that chops manure which passes across the margin of the plate portion as the auger rotates.

14. The improved manure spreader of claim 13 wherein the margin of the blade plate portion has four straight edges.

15. The improved manure spreader of claim 9 including a plurality of paddles extending tangentially outwardly from the shaft near the discharge opening, the paddles having a pushing surface which pushes manure out the discharge opening when the auger rotates.

16. The improved manure spreader of claim 15 wherein there are five paddles proceeding in a series in a frontward direction along the shaft, wherein each paddle is spaced axially equidistant the adjacent paddles and ninety degrees circumferentially from the adjacent paddles so that the back-most paddle and front-most paddle are circumferentially aligned.

17. An improved container for holding and conveying flowable materials, comprising:

(a) a container bed having a pair of side walls and a rounded bottom, the side walls forming the container bed into a general V-shape with the rounded bottom;

(b) an auger which includes (i) a shaft mounted for rotation about an axis adjacent to the rounded bottom of the container bed; and (ii) a continuous blade mounted to and extending radially outwardly from the shaft, the blade including plural helical portions and at least one plate portion substantially perpendicular to the axis of rotation of the shaft and extending between the helical portions of the blade to make the blade substantially continuous on the shaft, whereby rotation of the auger causes the helical portions of the blade to accelerate flowable material and causes the plate portions to slow the movement of the material so that boiling action of material is inhibited, and furthermore causes the plate portions to each create turbulence within the material as it moves against the plate portions which inhibits bridging of material over the auger.

18. The improved container of claim 17 wherein the continuous blade has plural plate portions, each plate portion extending between helical portions.

19. The improved container of claim 18 wherein each helical portion extends around the shaft in an arc between about 180° and 360° and each plate portion extends about the shaft in an arc of approximately 180°.

20. The improved container of claim 17 wherein the plate portions of the blade each have a margin which defines the radial height of the plate portion, and wherein the radial height of a plate portion where it joins a back end of a helical portion is equal to the radial height of the helical portion and is less elsewhere along its margin, so that some material may pass across the margin of the plate portion.

21. The improved container of claim 20 wherein the margin of each plate portion has at least one straight edge that chops material which passes across the margin of the plate portion as the auger rotates.

22. The improved container of claim 21 wherein the margin of the blade plate portion has four straight edges.

23. A method of moving liquid or semi-solid manure onto a field from a manure spreader having a generally V-shaped bed formed from a pair of sidewalls and a rounded bottom, one sidewall having a discharge opening formed therein, a pair of end walls, and an auger located to rotate above the rounded bottom of the bed, the auger having a shaft with a back end which is rotatably mounted to the back end wall of the bed and a front end which is rotatably mounted to the front end wall of the bed, a continuous blade extending from the shaft with plural helical portions and at least one plate portion substantially perpendicular to an axis of the auger and extending between the helical portions of the blade, comprising the steps of:
(a) rotating the auger so that the helical portions and plate portions of the blade contact some of the manure;
(b) accelerating some of the manure toward the front end wall with the helical portions of the blade;
(c) slowing the advance of the manure toward the front end wall with the plate portions of the blade so that boiling action of manure against the front end wall is thereby inhibited;
(d) creating upward turbulence within manure as it moves against the plate portions to thereby inhibit bridging of manure over the auger; and
(e) moving the manure out the discharge opening in the side wall.

24. The method of claim 23 wherein the step of moving the manure out the discharge opening in the side wall is carried out with pushing surfaces on at least one paddle which extends tangentially outwardly from the shaft near the discharge opening.

25. The method of claim 23 which further comprises the step of chopping the manure with at least one straight edge on a margin of each plate portion of the blade.

* * * * *